United States Patent
Li

(10) Patent No.: US 12,526,129 B2
(45) Date of Patent: Jan. 13, 2026

(54) DATA ENCRYPTION METHOD, DATA DECRYPTION METHOD, TERMINAL, AND STORAGE MEDIUM

(71) Applicant: BIGO TECHNOLOGY PTE. LTD., Singapore (SG)

(72) Inventor: Yan Li, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 255 days.

(21) Appl. No.: 18/040,796

(22) PCT Filed: Jul. 28, 2021

(86) PCT No.: PCT/CN2021/108935
§ 371 (c)(1),
(2) Date: Feb. 6, 2023

(87) PCT Pub. No.: WO2022/028289
PCT Pub. Date: Feb. 10, 2022

(65) Prior Publication Data
US 2024/0031129 A1    Jan. 25, 2024

(30) Foreign Application Priority Data
Aug. 7, 2020   (CN) .......................... 202010790159.3

(51) Int. Cl.
*H04L 9/06* (2006.01)
*H04L 9/08* (2006.01)

(52) U.S. Cl.
CPC .......... *H04L 9/0631* (2013.01); *H04L 9/0869* (2013.01); *H04L 9/0877* (2013.01)

(58) Field of Classification Search
CPC ... H04L 9/0631; H04L 9/0869; H04L 9/0877; H04L 9/0894; H04L 9/0863; G06F 21/53; G06F 21/602
See application file for complete search history.

(56) References Cited

U.S. PATENT DOCUMENTS

2007/0101122 A1   5/2007  Guo
2009/0235349 A1 *  9/2009  Lai ........................ H04L 9/3213
                                          726/10

(Continued)

FOREIGN PATENT DOCUMENTS

CA    3087924 A1 *  7/2019  ......... G06F 21/6227
CN    103023877 A  *  4/2013

(Continued)

OTHER PUBLICATIONS

International Search Report of the International Searching Authority for State Intellectual Property Office of the People's Republic of China in PCT application No. PCT/CN2021/108935 issued on Nov. 1, 2021, which is an International application to which this application claims priority.

(Continued)

*Primary Examiner* — Carl G Colin
*Assistant Examiner* — Phillip Emmanuel Wilson
(74) *Attorney, Agent, or Firm* — Kolitch Romano Dascenzo Gates LLC

(57) ABSTRACT

Provided is a data encryption method. The data encryption method includes: determining source data requested to be encrypted by an application in an untrusted execution environment; generating reference data corresponding to the source data in the untrusted execution environment, wherein the reference data is data for one-time use in encrypting the source data; reading a primary key generated for the application in a trusted execution environment; acquiring security data by encrypting the reference data using the primary key in the trusted execution environment; and acquiring target data by encrypting the source data using the security data in the untrusted execution environment.

17 Claims, 6 Drawing Sheets

(56) References Cited

U.S. PATENT DOCUMENTS

| | | |
|---|---|---|
| 2015/0117640 A1 | 4/2015 | Park et al. |
| 2015/0339664 A1* | 11/2015 | Wong .................. H04L 63/0823 705/71 |
| 2016/0119318 A1* | 4/2016 | Zollinger .............. H04L 9/3242 713/171 |
| 2016/0364559 A1 | 12/2016 | Bali et al. |
| 2017/0093806 A1* | 3/2017 | Phegade ............. H04L 63/0428 |
| 2017/0206174 A1 | 7/2017 | Keranen et al. |
| 2018/0270045 A1* | 9/2018 | Almuhammadi ........ G09C 1/00 |
| 2018/0332010 A1* | 11/2018 | Graber .................. H04L 63/068 |
| 2018/0337778 A1* | 11/2018 | Scheiblauer .......... H04L 9/0866 |
| 2019/0147170 A1* | 5/2019 | Keselman ............. G06F 21/602 713/189 |
| 2019/0147188 A1* | 5/2019 | Benaloh .............. G06F 21/6245 726/26 |
| 2019/0340393 A1* | 11/2019 | Mo ........................ G06F 21/554 |
| 2021/0083843 A1* | 3/2021 | Salomon ............... G06F 21/602 |
| 2021/0191880 A1* | 6/2021 | Ki ....................... G06F 12/1408 |

FOREIGN PATENT DOCUMENTS

| | | | |
|---|---|---|---|
| CN | 105812332 A | | 7/2016 |
| CN | 106980794 A | | 7/2017 |
| CN | 110110548 A | | 8/2019 |
| CN | 111444528 A | * | 7/2020 ............. G06F 21/57 |
| CN | 111917540 A | | 11/2020 |
| EP | 3614292 A1 | * | 2/2020 |
| KR | 20180016349 A | | 2/2018 |

OTHER PUBLICATIONS

The State Intellectual Property Office of People's Republic of China, First Office Action in Patent Application No. CN202010790159.3 issued on Jan. 3, 2023, which is a foreign counterpart application corresponding to this U.S. Patent Application, to which this application claims priority.

Extended European Search Report Communication Pursuant to Rule 62 EPC for European Application No. 21852390.0 dated Jul. 25, 2024, which is a foreign counterpart application to this application.

* cited by examiner

DATA ENCRYPTION METHOD, DATA DECRYPTION METHOD, TERMINAL, AND STORAGE MEDIUM

CROSS-REFERENCE TO RELATED APPLICATION

The present disclosure is a U.S. national stage of international application No. PCT/CN2021/108935, filed on Jul. 28, 2021, which is based on and claims priority to Chinese Patent Application No. 202010790159.3 filed with China National Intellectual Property Administration on Aug. 7, 2020, the contents of which are incorporated herein by references in their entireties.

TECHNICAL FIELD

Embodiments of the present disclosure relate to security technologies, for example, to a data encryption method, a data decryption method, a terminal, and a storage medium.

BACKGROUND OF THE INVENTION

In a case that an application installed in a mobile terminal stores sensitive data, the data is generally encrypted using an algorithm, such as a symmetric key algorithm or an asymmetric key algorithm, to protect the personal privacy of users.

SUMMARY OF THE INVENTION

Embodiments of the present disclosure provide a data encryption method, a data decryption method, a terminal, and a storage medium.

According to some embodiments of the present disclosure, a data encryption method is provided. The data encryption method includes:
  determining source data requested to be encrypted by an application in an untrusted execution environment;
  generating reference data corresponding to the source data in the untrusted execution environment, wherein the reference data is data for one-time use in encrypting the source data;
  reading a primary key generated for the application in a trusted execution environment;
  acquiring security data by encrypting the reference data using the primary key in the trusted execution environment; and
  acquiring target data by encrypting the source data using the security data in the untrusted execution environment.

According to some embodiments of the present disclosure, a data decryption method is further provided. The data decryption method includes:
  determining target data requested to be encrypted by an application in an untrusted execution environment;
  reading reference data associated with the target data in the untrusted execution environment, wherein the reference data is data for one-time use in decrypting the target data;
  reading a primary key generated for the application in a trusted execution environment;
  acquiring security data by encrypting the reference data using the primary key in the trusted execution environment; and
  acquiring source data by decrypting the target data using the security data in the untrusted execution environment.

According to some embodiments of the present disclosure, a mobile terminal is further provided. The mobile terminal includes:
  one or more processors; and
  a memory configured to store one or more programs; wherein
  the one or more processors, when loading and running the one or more programs, are caused to perform data encryption method according to the above embodiments or the data decryption method according to the above embodiments.

According to some embodiments of the present disclosure, a non-volatile computer readable storage medium is further provided. The non-volatile computer readable storage medium stores a computer program thereon, wherein the computer program, when loaded and run by a processor, causes the processor to perform the data encryption method according to the above embodiments or the data decryption method according to the above embodiments.

DETAILED DESCRIPTION OF THE INVENTION

In some practices of data encryption, no matter how secure and firm the encryption algorithm is designed, once the key is revealed, the attacker can directly use the key to call the encryption algorithm to decrypt the data, and therefore, one of the important points of the security of the encryption algorithm is the secure preservation of the used key.

In some practices, the key of the application is mainly pre-embedded in the code of the application in a hard coding manner, such as Java layer and Native layer of Android. To mitigate the threat on such unprotected password storage, a code obfuscation mechanism, such as Obfuscator-LLVM (OLLVM), which is an open-source code obfuscating compiler, is often used to obfuscate the code logic to increase the difficulty of reverse code reading.

However, the code obfuscation mechanism only obfuscates the code logic, and does not obfuscate the array variables or constants, such as the pre-embedded key. Such type of method has the following three disadvantages:

The key does not have any independent security protection, and only depends on security reinforcement of the code, such that the key is easy to be statically analyzed and extracted by an attacker, and the attacker easily acquires the authority through the vulnerability of the mobile terminal.

After the attacker reverses the code, the key is not directly extracted, and the function of starting the key is directly called using the upper-layer function code to directly decrypt the data.

As it is not easy to change, or each application instance is implemented using different keys, the pre-embedded keys of the applications of the same version or all versions are consistent, and the attacker can export data from one application and puts the data on another cracked application for data decryption, that is, the data is still decrypted when leaving the mobile terminal.

In terms of the security risks described above, the embodiments of the present disclosure disclose a data encryption method and apparatus, a data decryption device and apparatus, a terminal, and a storage medium, which can greatly deal with the data security risks.

The present disclosure will be described hereinafter with reference to the accompanying drawings and the embodiments.

First Embodiment

Figure 1:
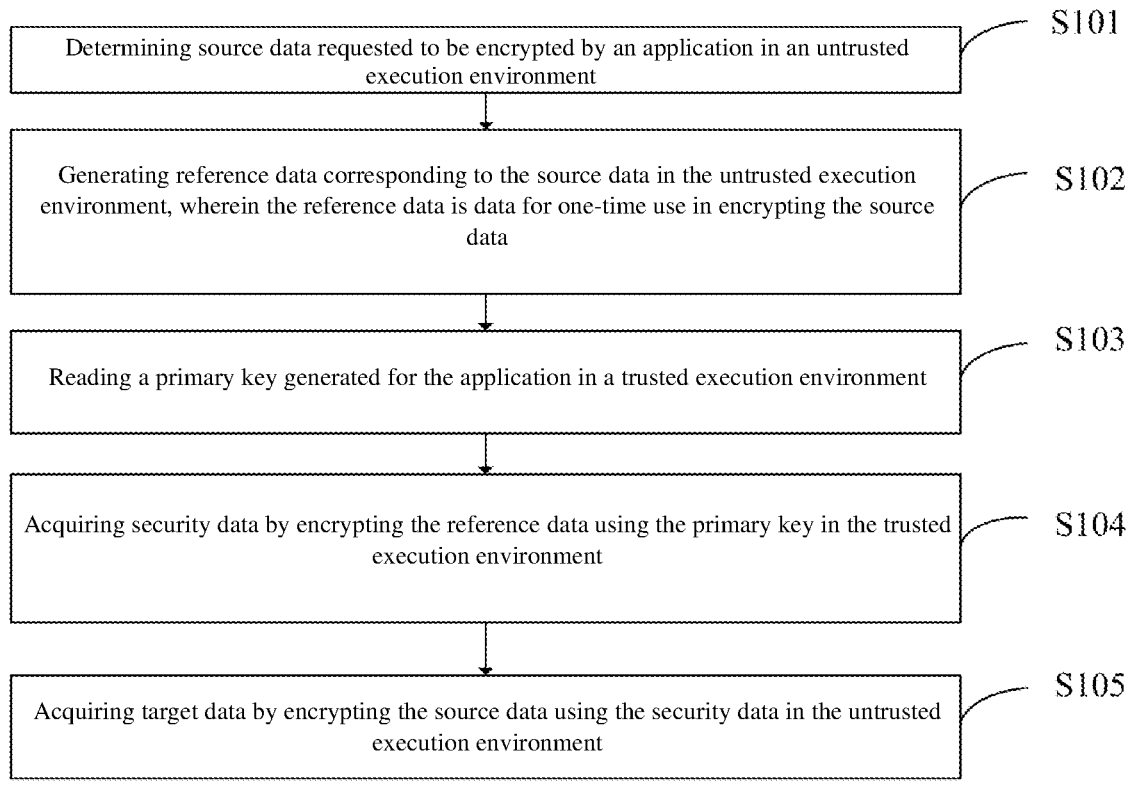
FIG. 1 is a flowchart of a data encryption method according to some embodiments of the present disclosure.

FIG. 1 is a flowchart of a data encryption method according to some embodiments of the present disclosure. In the embodiments, the data is encrypted using a one-time key, and the method is performed by a data encryption apparatus. The data encryption apparatus is implemented by software and/or hardware, and is configured in a mobile terminal, such as a mobile phone, a tablet computer, an intelligent wearable device, and the like. The intelligent wearable device includes intelligent glasses, an intelligent watch, and the like.

Figure 2:
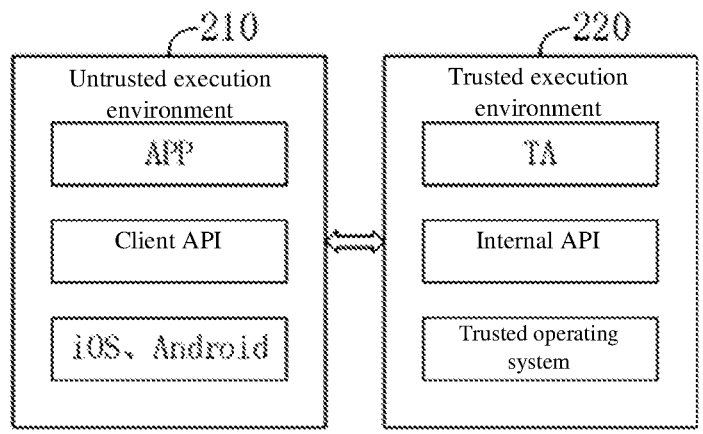
FIG. 2 is a schematic diagram of an environment of a mobile terminal according to some embodiments of the present disclosure.

In the embodiments, as shown in FIG. 2, the mobile terminal includes the following two environments:

1. Untrusted Execution Environment 210

The untrusted execution environment is a general purpose environment for the mobile terminal, runs a general purpose operating system (OS), such as Android™, iOS®, Linux®, and the like, and provides a service to an upper-layer third-party application (APP).

The untrusted execution environment has a potential safety hazard. For example, application isolation achieved based on the OS is easily bypassed, and a bug easily occurs due to the huge OS code. The OS can see data inside the application, and lack of isolation means that the application cannot safely store a key and sensitive data.

2. Trusted Execution Environment 220

The trusted execution environment is a safe region on a processor in the mobile terminal, provides an execution environment isolated from the untrusted execution environment, and independently runs a trusted operating system (trusted OS).

Isolation is an essential attribute of a trusted execution environment and achieved by software or hardware, and more security mechanism integrating software, hardware, the Internet Protocol (IP) and bus are applied in the isolation environment.

For the protection of the hardware mechanism, the hardware implementation method is not specified. The untrusted execution environment does not directly access the trusted execution environment, but is used as a client of the trusted execution environment to request a secure service from the trusted OS of the trusted execution environment through an application programming interface (API).

The trusted execution environment is standardized by the global platform (GP) and the like, and is ported on various platforms. The GP defines the protection profile of the trusted execution environment and the required hardware protection strength.

The trusted execution environment uses a secure storage mechanism for the key to ensure the authentication, integrity, and confidentiality.

The trusted execution environment supports secure loading and executes a plurality of trusted applications (TAs). The TAs are mutually isolated from each other to ensure the confidentiality and integrity of codes and data loaded onto the trusted execution environment, and the trusted OS provides an internal API in the trusted execution environment to provide services for the TAs.

For different OSs, the trusted execution environments are different. For example, in a case that the OS is an iOS system, the trusted execution environment is Secure Enclave. For another example, in a case that the OS is an Android system, the trusted execution environment is trusted execution environment (TEE) and REE (untrusted execution environment, or rich execution environment).

As shown in FIG. 1, the method includes the following processes:

In S101, source data requested to be encrypted by an application is determined in an untrusted execution environment.

One or more applications (APPs) are installed in the untrusted execution environment (for example, REE), and the APP is an application of a general purpose operating system or a third-party application, such as a camera application, a browser, an email, a notepad, an address book, a shopping application, a short video application, and the like.

In some embodiments, the general purpose operating system is denoted as an untrusted operating system, such as Android™, iOS®, Linux®, and the like.

In running the application, data with different security levels is generated. The data is usually plaintext, and part or all of the data to be generated and stored due to factors such as higher security level, service requirements, and the like is used as source data to be encrypted.

In different scenarios, the form of the source data varies.

For example, for a browser, in a case that a user logs in a website by an account and a password (also called a password), the browser records the account and the password, the website returns the Cookie after the account and the password are successfully verified, and the account, the password and the Cookie are stored as source data in an encrypted manner.

For another example, for a notepad, the user records some pending transactions, and the pending transactions are stored as source data in an encrypted manner.

For another example, for an address book, a user records information of contacts, such as names, mobile phone numbers, avatars, and the like. Generally, the user browses the information of contacts after unlocking the mobile terminal, other applications read the information of contacts under authorization, and some privacy information of contacts are stored as source data in an encrypted manner.

The application and the source data to be encrypted corresponding to the application are only examples, and other applications and source data to be encrypted corresponding to other applications, such as user identity information, payment information, and audio and video data, are set in implementing the embodiments of the present disclosure according to actual situations. Moreover, in addition to the above applications and the source data to be encrypted, those skilled in the art can also adopt other applications and source data to be encrypted according to actual needs.

In S102, reference data corresponding to the source data is generated in the untrusted execution environment, wherein the reference data is data for one-time use in encrypting the source data.

Figure 3:
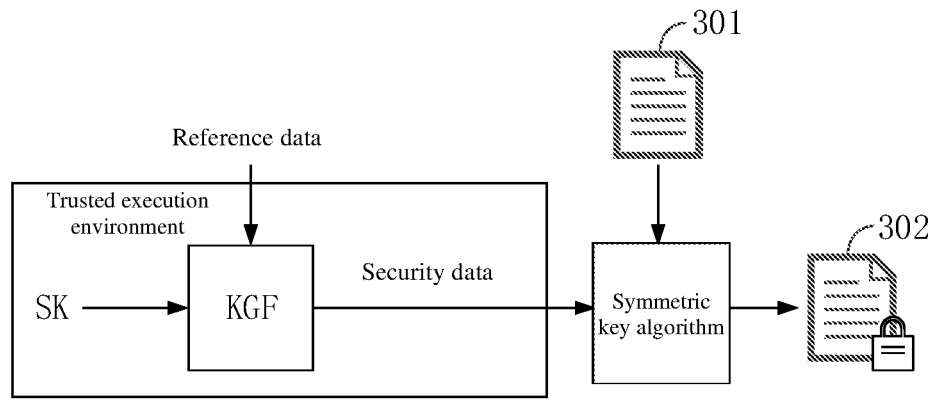
FIG. 3 is a schematic flowchart of an encryption process according to some embodiments of the present disclosure.

As shown in FIG. 3, after the source data requested to be encrypted by the application is received in the untrusted execution environment (e.g., REE), data valid for this encryption is generated for the source data in the untrusted execution environment, and is determined as the reference data.

In some embodiments, the data valid for this encryption is unique data in encrypting the source data, that is, the reference data is one-time data and is not reused.

In an implementation, a value Nonce is randomly generated by a rand ( ) function or the like in an untrusted execution environment (e.g., REE), and is determined as the reference data.

For security, the length of the random value Nonce is 32 bytes or more than 32 bytes.

In another implementation, in an untrusted execution environment (e.g., REE), the current timestamp is read from the general purpose operating system by a function, such as Calendar.getInstance ( ) new Time ( ) or the like, and is determined as the reference data.

The random value Nonce and the timestamp in the two implementations are used alone or in combination. In combination use, the overall anti-collision and forward directional characteristics of the encryption mechanism in the embodiments are ensured.

Moreover, in addition to the above two implementations, the reference data is also generated using other methods, for example, operations such as shifting and XOR on the randomly-generated data, mapping the current timestamp by a predetermined mapping function, and the like.

In S103, a primary key generated for the application is read in a trusted execution environment.

As shown in FIG. 3, in a trusted execution environment (e.g., TEE), an application in an untrusted execution environment (e.g., REE) is provided with a key. The key is referred to as a primary key SK for ease of distinction, and the primary key SK is defined to generate security data for encrypting the source data at this time.

An application exists in the untrusted execution environment, and a primary key SK corresponding to the application exists in the trusted execution environment.

Generally, the application and the primary key SK are in a one-to-one correspondence, that is, one application corresponds to one primary key SK. Accordingly, a mapping relationship between an identification (such as a packet name) of the application and the primary key SK is established in the database.

In encrypting the source data, an identification of an application and the reference data are sent to a trusted execution environment (e.g., TEE) in an untrusted execution environment (e.g., REE) through an API provided by the trusted execution environment (e.g., TEE), and a TA in the trusted execution environment (e.g., TEE) is requested to generate security data using the reference data. The security data is used to encrypt the source data.

In this case, the TA in the trusted execution environment (e.g., TEE) searches for the primary key SK mapped by the identification of the application among the database.

In S104, security data is acquired by encrypting the reference data using the primary key in the trusted execution environment.

As shown in FIG. 3, in a trusted execution environment (e.g., TEE), a TA provides a key generation function (KGF). The key generation function KGF is defined to generate the security data. On this basis, the reference data (e.g., random value Nonce and Timestamp) is used as an input, the reference data is encrypted using a primary key SK, and data output after the encryption is set as the security data.

The security data is applied to a symmetric key algorithm, the security data at least includes a key, and the key in the security data is called a secondary key for ease of distinction. In addition to the secondary key, the security data further includes other data according to different symmetric key algorithms.

In addition to the encrypt operation, the encryption process on the reference data includes other operations, such as adding data of other dimensions, performing an XOR operation, and performing a shift operation for improving the security.

In some embodiments of the present disclosure, S104 includes the following processes: step one, step two, and step three. The three steps are as follows:

In step one, the reference data is combined with a predetermined label in a trusted execution environment to acquire a target array.

Figure 4:
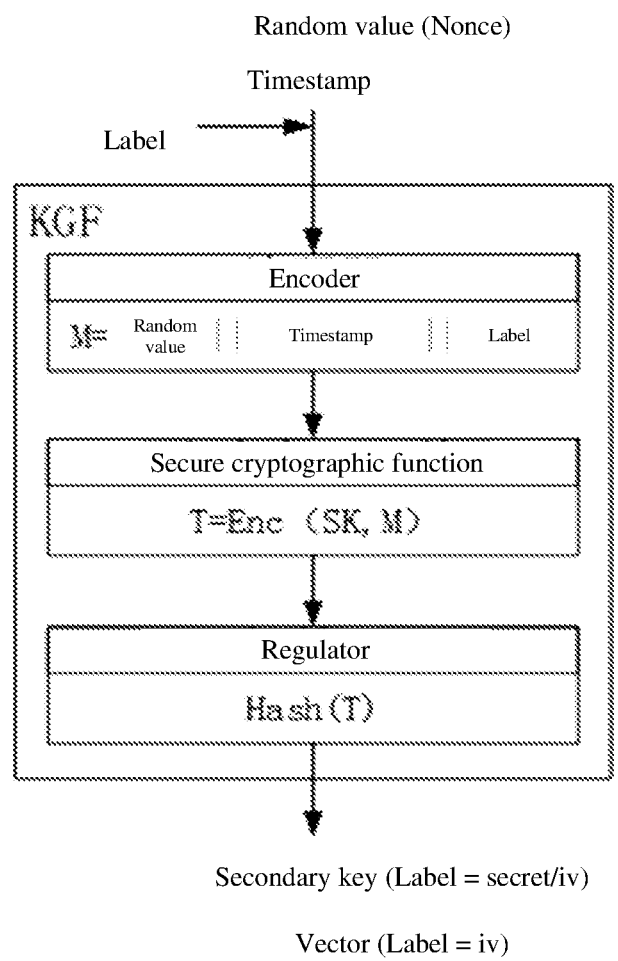
FIG. 4 is an exemplary diagram of a KGF algorithm according to some embodiments of the present disclosure.

As shown in FIG. 4, taking the KGF algorithm as an example, a character string is customized by a developer, and stored in a trusted execution environment (e.g., TEE) of the mobile terminal as a label.

The label is a manual name of the one-time security data to be generated. The label is defined to represent the type of the security data and increase the dimensionality of input data to improve security, and is also convenient for developers to remember and reduce mis-operation of the security data.

In some embodiments, in a case that the label is secret, the secret indicates that the type of the security data is a key, and the key is called a secondary key for ease of distinction.

In some embodiments, in a case that the label is iv, the iv indicates that the type of the security data is a secondary key and a vector.

In a trusted execution environment (e.g., TEE), the TA is represented in a form of an encoder, the reference data (e.g., the random value Nonce and the Timestamp) and the label are spliced and encoded in a predetermined order to form a Hex array, and the Hex array is determined as a target array M.

For example, M=Nonce ∥ Timestamp ∥ Label.

In step two, candidate data is acquired by encrypting the target array using the primary key in the trusted execution environment.

As shown in FIG. 4, a target array M is encrypted using a primary key and a secure cryptographic function provided by the trusted execution environment (e.g., TEE) to acquire an array T in a form of a ciphertext. The array T is determined as the candidate data, i.e., T=Enc (SK, M), and Enc represents an encryption function.

Taking the TEE as an example of a trusted execution environment, the secure cryptographic function provided by the TEE includes a Hash-based message authentication code (HMAC, key-dependent Hash operation) algorithm, an advanced encryption standard (AES) algorithm, an RSA encryption algorithm, an elliptic curve digital signature algorithm (ECDSA), an RSA, and the like. The HMAC and the AES have faster computation speed, and the two secure cryptographic functions are selectable.

In step three, the candidate data is regulated into data with a specified length in the trusted execution environment, and the data with the specified length is determined as security data matching the label.

In a trusted execution environment (e.g., TEE), the TA is represented in a form of a regulator.

As shown in FIG. 4, as the candidate data T is in any length, and the length of the security data required for subsequent encryption is fixed, the regulator computes and outputs a character string with a specified length by taking the candidate data T as the input, and the character string with the specified length is determined as one-time security data. The type of the security data is defined by a label.

The regulator regulates the candidate data into the security data using a one-way Hash function, that is, the output character string is digest data, the one-way Hash function is denoted as Hash (T), the one-way Hash function computes data with any length and generates digest information $B_0B_1B_2 \ldots B_{L-2}B_{L-1}$ with fixed length of L bytes. L is a positive integer. For example, a message digest algorithm 5 (MD5) outputs digest data of 16B, a secure Hash algorithm (SHA) 1 outputs digest data of 20B, SHA224 outputs digest data of 28B, SHA256 outputs digest data of 32B, SHA384 outputs digest data of 48B, SHA512 outputs digest data of 64B, and so on.

For example, the security data includes a secondary key (one-time key), or a secondary key and a vector (one-time IV).

In response to the label being a first value (e.g., iv), in a trusted execution environment (e.g., TEE), a one-way Hash function is used to compute digest data with a first specified length for the candidate data, and the digest data with the first specified length serves as a secondary key and a vector (one-time IV) which are applicable to an AES algorithm in the symmetric key algorithms.

In response to the label being a second value (e.g., secret), in a trusted execution environment (e.g., TEE), a one-way Hash function is used to compute digest data with a second specified length for the candidate data, and the digest data with the second specified length serves as a secondary key which is applicable to a non-AES algorithm in the symmetric key algorithms, e.g., RC4, Chacha20, and the like.

In FIG. 4, in a case that the label is a first value (e.g. iv) or a second value (e.g. secret), a secondary key is present in the digest data; in a case that the label is the first value (e.g., iv), a vector (one-time IV) is present in the digest data. In other words, in a case that the label is the first value (e.g., iv), the digest data includes both the secondary key and the vector (one-time IV).

In S105, target data is acquired by encrypting the source data using the security data in the untrusted execution environment.

In the embodiments, as shown in FIG. 3, after a TA in a trusted execution environment (e.g., TEE) generates security data for the source data to be encrypted of the application, the security data is output to an untrusted execution environment (e.g., REE); in the untrusted execution environment (e.g., REE), the source data is encrypted using a symmetric key algorithm, and the encrypted ciphertext is the target data.

FIG. 3 shows source data 301 and target data 302.

For example, the security data includes a secondary key, or a secondary key and a vector (one-time IV).

In some embodiments, in the untrusted execution environment, the source data is encrypted into the target data by calling the AES algorithm in the symmetric key algorithms and using a vector, as an initialization vector (IV), and the secondary key.

Figure 5:
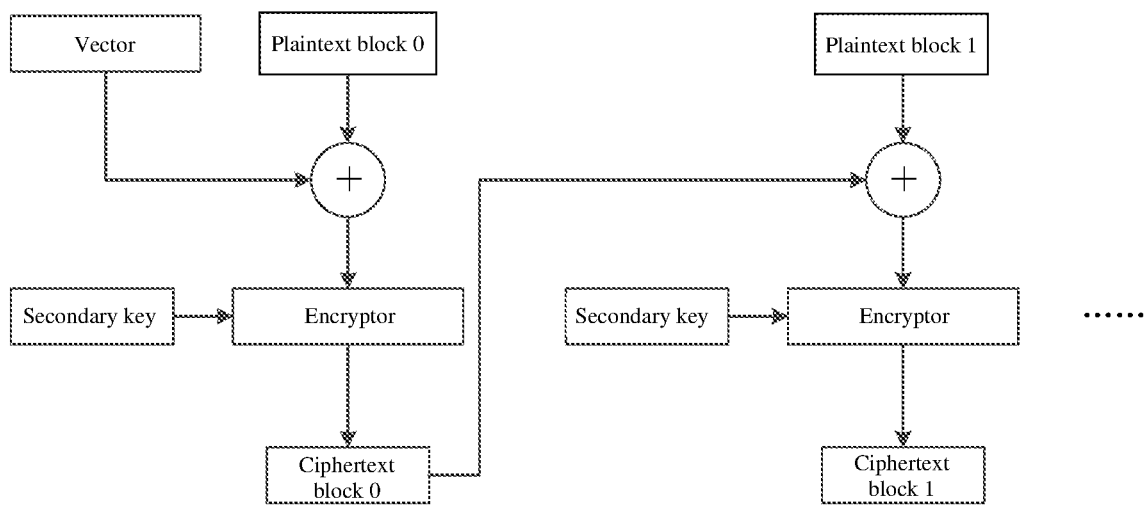
FIG. 5 is a schematic diagram of an encryption process by an AES according to some embodiments of the present disclosure.

As shown in FIG. 5, in a Cipher Block Chaining (CBC) mode of the AES algorithm, block encryption is implemented to split source data into a plurality of plaintext blocks, such as plaintext block 0, plaintext block 1, . . . , and so on. For each plaintext block, after the XOR processing is performed on the plaintext block and the encryption vector, the encryptor performs encryption using the secondary key and outputs a ciphertext block which is an array of binary values, such as ciphertext block 0, ciphertext block 1, . . . , and so on. The ciphertext blocks are combined to acquire the target data.

For the first plaintext block (i.e., plaintext block 0), the encryption vector is the initialization vector IV, that is, the vector in the security data. For the $n^{th}$ plaintext block (i.e., plaintext block 1, . . . , and so on), the encryption vector is the $(n-1)^{th}$ ciphertext block, where n>1.

In another embodiment, in the untrusted execution environment, the source data is encrypted into the target data using a secondary key and calling a non-AES algorithm in the symmetric key algorithms. The non-AES algorithms include RC4, Chacha20, and the like.

The encryption algorithms and the security parameters are only examples, and other encryption algorithms and security parameters are set according to actual situations in implementing the embodiments of the present disclosure.

In some embodiments, the source data requested to be encrypted by an application is determined in an untrusted execution environment, and the reference data corresponding to the source data is generated. The reference data is data for one-time use in encrypting the source data. A primary key generated for the application is read in a trusted execution environment, and security data is acquired by encrypting the reference data using the primary key. Target data is acquired by encrypting the source data using the security data in the untrusted execution environment.

In the embodiments, the trusted execution environment is implemented based on a security chip at a hardware level, and an attacker is difficult to break the security chip, such that the security strength of the trusted execution environment is high, and the security of the primary key and the security data is ensured.

The primary key is generated for one application, such that the primary keys used by the applications of the same version or the applications of all versions are different. The reference data is valid in this encryption and decryption, such that the security data generated based on the primary key and the reference data has the characteristic of one-time use. The one-time security data is not directly stored but generated in a trusted execution environment to meet the security of chosen-plaintext attack (CPA), and is not reversely cracked.

As the security data has the characteristic of one-time use, other mobile terminals do not generate the same security data for the same source data. Thus, the encrypted target data, even leaving the mobile terminal, is not decrypted by other mobile terminals.

As the inside of the trusted execution environment is protected by mandatory access control and is not directly accessed by the untrusted execution environment, the attacker cannot call a function for starting the primary key to decrypt the data. Thus, the aim of preventing illegal call attack is fulfilled.

In addition, the security data is generated in the trusted execution environment, and the low computation overhead in the trusted execution environment is ensured due to the small data amount of the security data. In the untrusted execution environment, the source data is encrypted and decrypted using the security data based on the processor with higher performance than the security chip, such that the low computation overhead in the trusted execution environment is ensured, and the low whole computation overhead is ensured.

For example, the trusted execution environment is an operation environment of a separate security chip, and the untrusted execution environment is an operation environment on other hardware different from the security chip.

For example, the security chip is a separate hardware chip dedicated for the trusted execution environment. The untrusted execution environment runs on hardware of the mobile phone in addition to the security chip, such as a memory of the mobile phone, a central processing unit, and a memory card, and may not be a separate chip.

The trusted execution environment and the untrusted execution environment are deployed in most mobile terminals. In addition, the cryptographic algorithm provided by the mobile terminal is sharable, such that the compatibility is within an acceptable degree, library files are not required to be deployed additionally, and the storage overhead is low.

In addition to pre-embedding the key of the application into the code of the application in a hard-coded manner, there are two methods as follows:

In the first method, the key is encrypted and stored using the white-box cryptographic technology by the application.

The white-box cryptographic technology is a cryptographic technology capable of resisting white-box attack. The white-box attack means that an attacker has complete control capability on a mobile terminal, and internal data can be observed and changed during program operation. The attack environment is called a white-box attack environment.

Most environments (such as Android and iOS) of mobile terminals are the white-box attack environment in many cases, and protecting the security of the key is a basic requirement of the white-box cryptographic technology. The white-box cryptographic technology generally uses an AES algorithm, ensures that the key completes the encryption and decryption on sensitive data under the condition that the key does not appear in a plaintext form, so as to improve the security of key storage. The white-box cryptographic technology is suitable for the scenarios of mobile terminals.

Although the white-box cryptographic technology solves the threat situation that the key is statically analyzed and extracted by a reverse code, the defect of hard coding of the key on a code mode is not solved. That is, a function for starting the key is directly called by an upper-layer function code to directly decrypt data, and the data leaving the mobile terminal can still be decrypted.

In addition, the library of white-box cryptographic technology requires a storage space of approximately 350 KB, which adds at least 350 KB to the installation package storage for applications. Thus, it is burdensome for some applications sensitive to the size of the installation package.

In the second method, the key is encrypted and stored in a trusted execution environment based on a hardware security chip.

The mobile terminal deploys a trusted execution environment based on a security chip. The trusted execution environment is a region on a central processing unit (CPU), and the trusted execution environment is defined to provide a more secure space for the execution of data and codes, and ensure the confidentiality and integrity of the data and the codes.

Secure Enclave used in the iOS system is a trusted execution environment, and the Android system also requires the mobile terminal to deploy a trusted execution environment TEE and a secure hardware chip after Android 6.0+ and API Level 23+.

Some encryption modes use an AES encryption service of a trusted execution environment based on a hardware security chip to directly encrypt and store some sensitive personal data, such as face model parameters, bank card information, and the like. However, the security chip is a separate hardware with the high cost and limited computing capacity, and the direct encryption of a large amount of data and files using the encryption service of a trusted execution environment causes the low efficiency and high time overhead.

The test result shows that for 100 KB data, the AES-128 encryption and decryption time overhead of TEE is 6.2 seconds, and the RSA-2048 encryption and decryption time overhead of TEE is 45 seconds. However, personal sensitive data includes larger audio and video files, and the time overhead corresponding to the encryption of larger files or data is too high to bear.

In addition, the encryption and decryption services of TEE do not directly support CPA security. The support of CPA security is shown in the way that two sections of plaintext with the same content are encrypted to acquire two sections of ciphertext with different contents. Therefore, a key generation and storage service of the TEE needs to be called once before each encryption, and thus the time overhead is increased.

The comprehensive comparison between "the key of the application being embedded into the code of the application in a hard-coded manner," "the key being encrypted and stored using the white-box cryptographic technology by the application," "the key being encrypted and stored in a trusted execution environment based on a hardware security chip" and "the embodiments of the present disclosure" is shown in Table 1.

TABLE 1

Comparison of four types of treatment

|  | Hard coding of keys into codes | White-box cryptographic technology | Trusted execution environment based on a security chip | The embodiments of the present disclosure |
|---|---|---|---|---|
| Security strength | Not clear | AES-128 | Security chip | Security chip |
| Overall security | Can be reverse-cracked by codes or illegally called and cracked | Can be illegally called and cracked | Not reverse-cracked by codes and not illegally called and cracked | Not reverse-cracked by codes and not illegally called and cracked |
| Failure of the equipment upon the data leaving | No | No | Yes | Yes |
| Computation overhead | Very fast | Relatively fast | Very slow | Very fast |
| Storage overhead | Small | 350 KB | Small | Small |
| Compatibility | Great | Great | Android 6.0 API 23+ being only limited to AES and RSA encryption and decryption algorithms | Can use any cryptographic algorithm supported by Android 6.0 API 23+ |

As can be seen from Table 1, the security strength of the security chip is higher than that of AES-128. In addition, in the embodiments of the present disclosure, any cryptographic algorithm supported by Android 6.0 API 23+ can be used, such that the compatibility is relatively great, which is acceptable to the product.

In summary, the embodiments of the present disclosure are excellent in security strength, overall security, failure of equipment upon data leaving, computation overhead, and storage overhead.

Second Embodiment

Figure 6:
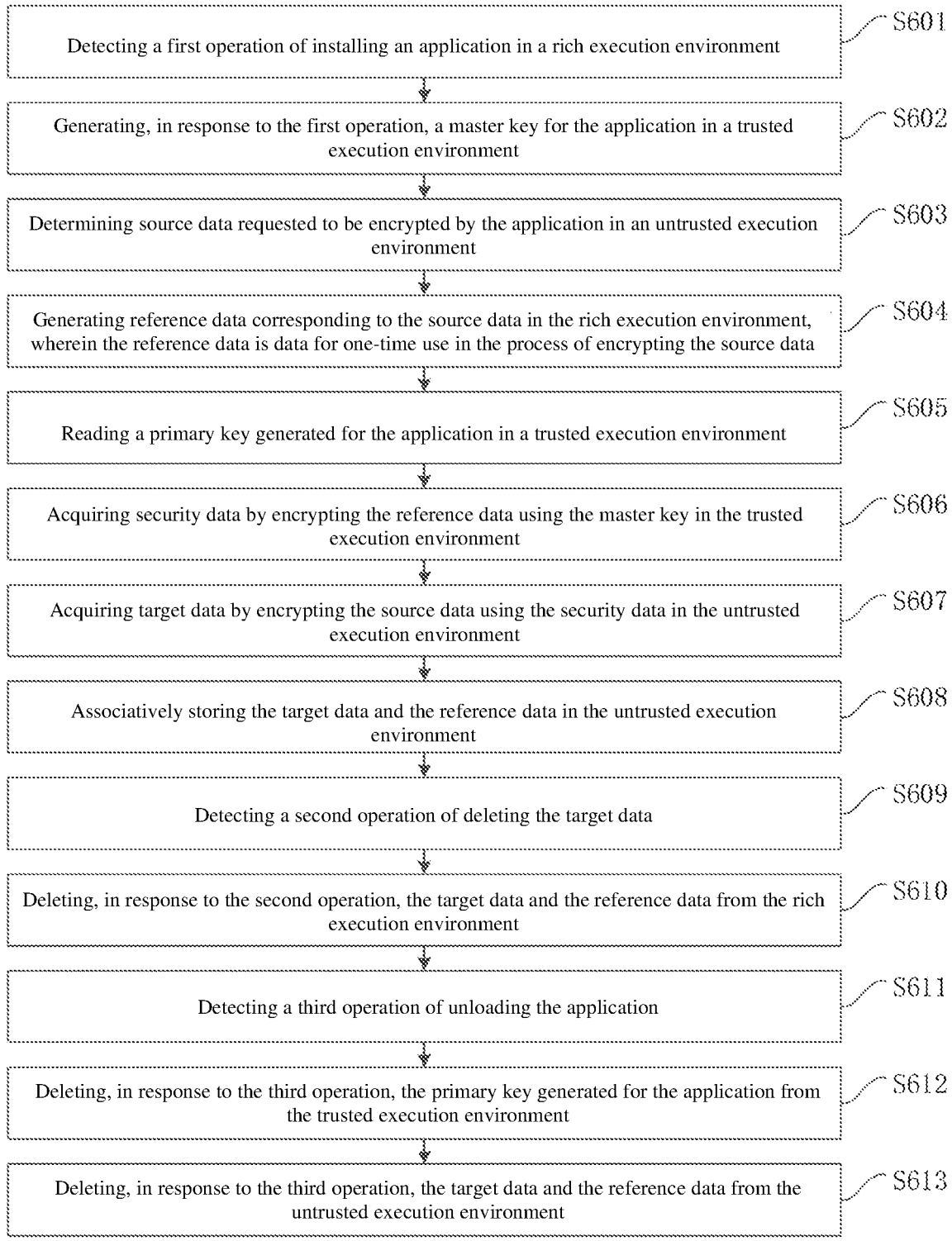
FIG. 6 is a flowchart of a data encryption method according to some embodiments of the present disclosure.

FIG. 6 is a flowchart of a data encryption method according to some embodiments of the present disclosure. The embodiments add processing operations of registering a primary key, managing the primary key and the reference data based on the foregoing embodiments, and the method described in the embodiments includes the following processes:

In S601, a first operation of installing an application in an untrusted execution environment is detected.

In a case that the embodiments are applied to a general purpose operating system, a first operation of installing an application in an untrusted execution environment (e.g., REE) is detected by calling a function of the general purpose operating system. The first operation is also referred to as an install operation.

Taking Android as an example, in a case that an application is installed, the Android operating system sends a broadcast, and a broadcast indicating that the application is installed is defined based on the broadcast mechanism. The broadcast information is that the application is installed, and the application is indicated by a package name. A broadcast indicating that an application is installed is registered in AndroidManifest. In a case that the broadcast indicating that the application is installed is received, an operation of installing the application in an untrusted execution environment (e.g., REE) is detected.

In a case that the embodiments are applied to an application itself, and an installation package of the application is executed, a first operation of installing the application in an untrusted execution environment (such as REE) is detected.

In S602, a primary key is generated for the application in a trusted execution environment in response to the first operation.

In a case that an application is installed in an untrusted execution environment (e.g., REE), a key generation and storage service in the trusted execution environment (e.g., TEE) are called through an API provided by the trusted execution environment (e.g., TEE), a random key is generated for the application and is determined as a primary key SK, and the primary key SK is stored in the trusted execution environment (e.g., TEE) for a long time. That is, a mapping relationship between an identification (e.g., package name) of the application and the primary key SK is established in a database of the trusted execution environment (e.g., TEE).

For example, the primary key SK uses any one of algorithms such as HMAC, AES, RSA and ECDSA, or is selected according to the algorithm for subsequent encryption on the source data.

Generally, the key length of HMAC is greater than or equal to 16 bytes, the key length of AES is greater than or equal to 16 bytes, and the key length of RSA is greater than or equal to 256 bytes, so as to ensure the security strength of mainstream commercial passwords which are at least equivalent to AES-128.

In S603, source data requested to be encrypted by an application is determined in an untrusted execution environment.

In S604, reference data corresponding to the source data is generated in the untrusted execution environment, wherein the reference data is data for one-time use in encrypting the source data.

In S605, a primary key generated for the application is read in a trusted execution environment.

In S606, security data is acquired by encrypting the reference data using the primary key in the trusted execution environment.

In S607, target data is acquired by encrypting the source data using the security data in the untrusted execution environment.

In S608, the target data and the reference data are associatively stored in the untrusted execution environment.

In the untrusted execution environment (such as REE), after the target data is acquired by encrypting the source data using the security data, in an installation directory of the application, or in an independent storage area, in addition to storing the target data, reference data used in the encryption is stored, and an association relationship between the target data and the reference data is established. The association relationship indicates that the reference data is defined to encrypt the target data.

The storage structure between the target data and the reference data is defined autonomously. For example, the target data C is acquired by encrypting the source data using a random value Nonce and a timestamp, and the Nonce and the timestamp with a fixed length, as a file header, are written together with the target data C in storage, that is, Nonce | Timestamp | C; or, the Nonce and the timestamp with a fixed length, as a file trailer, are written together with the target data C in storage, that is, C|Nonce|Timestamp.

In S609, a second operation of deleting the target data is detected.

In S610, the target data and the reference data are deleted from the untrusted execution environment in response to the second operation.

In running the application, a user actively requests to delete part of the target data, or the application automatically deletes its target data, or a third-party application (such as a cleaning application) also requests to delete the target data of the application.

For example, the Cookie in the browser is determined as the source data to be encrypted into target data, a mechanism for automatically cleaning an expired Cookie is arranged in the browser, and the browser deletes the Cookie after detecting the expired Cookie. That is, the target data is deleted correspondingly.

For another example, an event recorded in the notepad is determined as the source data and is encrypted into the target data, and the user deletes the event from the notepad after detecting that the event has been processed. That is, the target data is deleted correspondingly.

For another example, the contact information in the address book is determined as the source data and is encrypted into the target data, and one piece of contact information in the same contact information is deleted after the cleaning application detects the same contact information. That is, the target data is deleted correspondingly.

In a case that the second operation of deleting the target data is detected, corresponding target data is searched from an untrusted execution environment (such as REE), and the target data is deleted. The reference data is invalid after the target data is deleted. In this case, the reference data mapped by the target data is positioned, and the reference data is deleted along with the target data, such that the invalid data is cleared in time, and the storage overhead is reduced.

The invalidation means that other target data cannot be decrypted using the primary key and the reference data after the target data associated with the reference data is deleted.

In S611, a third operation of unloading the application is detected.

In a case that the embodiments are applied to a general purpose operating system, the third operation of unloading the application in an untrusted execution environment (such as REE) is detected by calling the function of the general purpose operating system, that is, the third operation is also referred to as an unload operation.

Taking Android as an example, in a case that an application is unloaded, the Android operating system sends a broadcast, and a broadcast indicating that the application is installed is defined based on the broadcast sending mechanism, the broadcast is that the application is unloaded, and the application is indicated by a package name. A broadcast indicating that an application is unloaded is registered in AndroidManifest, and an operation of unloading the application from an untrusted execution environment (e.g., REE) is detected in a case that the broadcast indicating that the application is unloaded is received.

In a case that the embodiments are applied to an application itself, a first operation of unloading the application in an untrusted execution environment (such as REE) is detected in a case that an unloading program of the application is executed.

In S612, the primary key generated for the application is deleted from the trusted execution environment in response to the third operation.

In S613, the target data and the reference data are deleted from the untrusted execution environment in response to the third operation.

After the third operation of unloading the application is detected, the primary key, the target data, and the reference data are invalid, and are not kept in the mobile terminal as the configuration files, such that the invalid data is cleared in time, and the storage overhead is reduced.

The invalidation means that after the unloading of the application is completed, in a case that the same application is reinstalled, a new primary key is newly generated, new reference data and new target data are newly generated for the same source data, and the original target data is decrypted using the new primary key and the new reference data.

In an aspect, a primary key generated for an application in a trusted execution environment (e.g. TEE) is requested to be deleted by an API provided by the trusted execution environment (e.g. TEE). In another aspect, all target data and all reference data stored in the application are deleted in an untrusted execution environment (e.g. REE).

For example, target data and reference data corresponding to the unloaded application are deleted.

Third Embodiment

Figure 7:
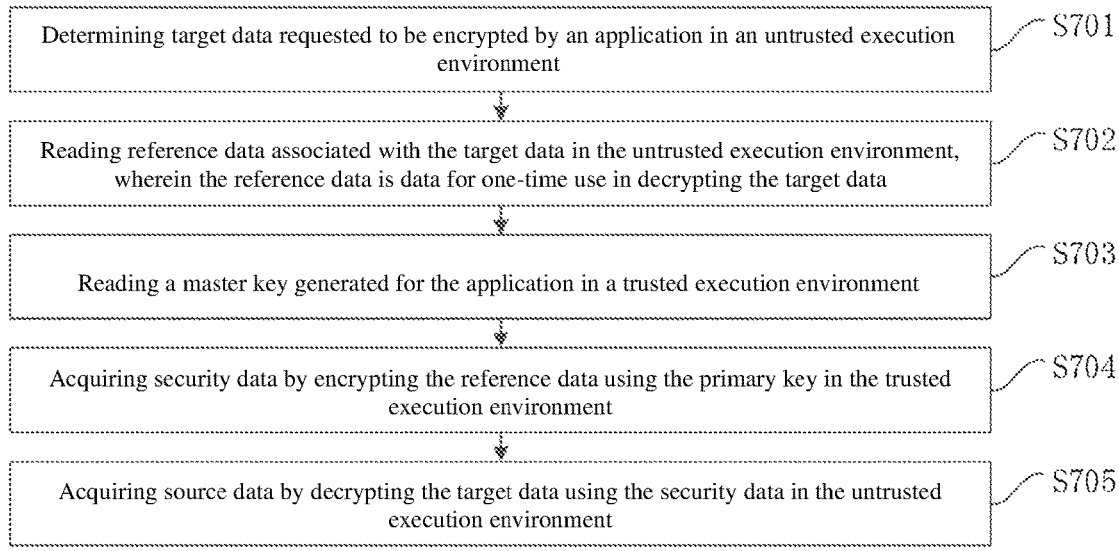
FIG. 7 is a flowchart of a data decryption method according to some embodiments of the present disclosure.

FIG. 7 is a flowchart of a data decryption method according to some embodiments of the present disclosure. In the embodiments, the data is decrypted using a one-time key, and the method is performed by a data decryption apparatus. The data decryption apparatus is implemented by software and/or hardware, and is configured in a mobile terminal, for example, a mobile phone, a tablet computer, a smart wearable device (such as smart glasses and a smart watch), and the like. The mobile terminal includes an untrusted execution environment and a trusted execution environment. The method includes the following processes:

In S701, target data requested to be encrypted by an application is determined in an untrusted execution environment.

One or more applications (APPs) are installed in an untrusted execution environment (e.g., REE), and the APPs request to use corresponding data according to different service requirements in running the APPs.

In the embodiments, the data is stored in the untrusted execution environment (e.g., REE) in the form of ciphertext, which is referred to as the target data. In this case, the target data is read from the untrusted execution environment (e.g., REE) to wait for decryption.

In S702, reference data associated with the target data is read in the untrusted execution environment, wherein the reference data is data for one-time use in decrypting the target data.

Figure 8:
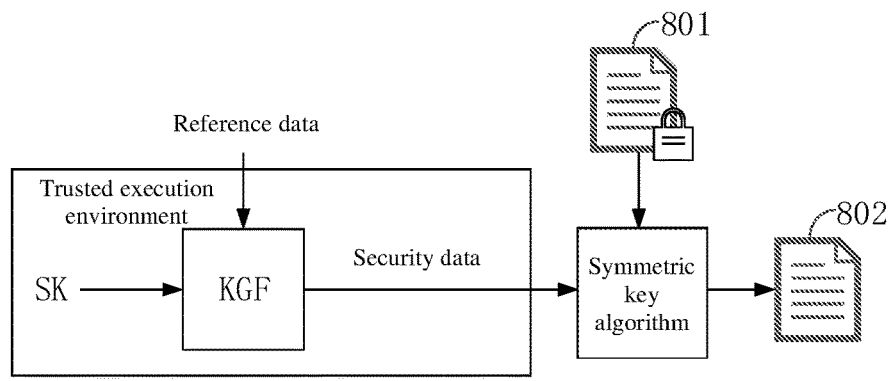
FIG. 8 is a schematic flowchart of a decryption process according to some embodiments of the present disclosure.

As shown in FIG. 8, the target data is acquired by encrypting the reference data, and the target data and the reference data are associatively stored in the untrusted execution environment (e.g., REE).

In decrypting the target data, the reference data corresponding to the target data is searched from the untrusted execution environment (such as REE) based on the association relationship.

In some embodiments, the reference data is valid in this decryption, and the data valid for this decryption refers to data unique in the operation of decrypting the target data. That is, the reference data is one-time data, and is not reused.

In some embodiments, the reference data is a timestamp for randomly generating a value Nonce and/or encrypting the target data.

The storage structure between the target data and the reference data is defined autonomously, and the reference data is read according to the storage structure in decryption. For example, in a case that the Nonce and the timestamp with a fixed length, as a file header, are written together with the target data C in storage, that is, Nonce | Timestamp | C. In decryption, a character string of the file header with a fixed length is read as the Nonce and the Timestamp, and the rest character string is C; or, the Nonce and the timestamp with a fixed length, as a file tailer, are written together with the target data C in storage, that is, C|Nonce|Timestamp. In decryption, the character string of the file tailer with a fixed length is read as Nonce and Timestamp, and the rest string is C.

In S703, a primary key generated for the application is read in a trusted execution environment.

As shown in FIG. 8, in a case that the target data is decrypted, an identification of an application and reference data are sent to a trusted execution environment (e.g., TEE) in an untrusted execution environment (e.g., REE) through an API provided by the trusted execution environment (e.g., TEE), and a TA in the trusted execution environment (e.g., TEE) is requested to use the reference data to generate security data which is used to decrypt the target data.

In this case, the trusted application (TA) in the trusted execution environment (e.g., TEE) searches for the primary key SK mapped by the identification of the application in the database.

In S704, security data is acquired by encrypting the reference data using the primary key in the trusted execution environment.

As shown in FIG. 8, in a trusted execution environment (e.g., TEE), a TA provides a key generation function (KGF) that is defined to generate the security data, for which reference data (e.g., the random value Nonce and Timestamp) is determined as an input, the reference data is encrypted using a primary key SK, and data output after the encryption is set as the security data.

In some embodiments of the present disclosure, the reference data and a predetermined label are combined into a target array in a trusted execution environment (e.g., TEE). The label is defined to indicate the type of security data.

In a trusted execution environment (e.g., TEE), a target array is encrypted into candidate data using a primary key.

In a trusted execution environment (e.g., TEE), candidate data is regulated into data with a specified length as security data matching a label.

In one example, security data includes a secondary key, or a secondary key and a vector. In the embodiments, in a case that the label is a first value, digest data with a first specified length is computed for the candidate data as a secondary key and a vector in the trusted execution environment. Or, in a case that the label is a second value, digest data with a second specified length is computed for the candidate data as a secondary key in the trusted execution environment.

For example, the digest data with the first specified length is determined as the secondary key and the vector, which means that the digest data with the first specified length includes both the secondary key and the vector. The digest data with the second specified length is taken as the secondary key, which means that the digest data with the second specified length includes the secondary key.

In the embodiments of the present disclosure, as the applications in S704 and S104 are substantially similar, the description is simplified, reference may be made to part of the description of S104 for relevant points, and the embodiments of the present disclosure are not described in detail herein.

In S705, the source data is acquired by decrypting the target data using the security data in the untrusted execution environment.

As shown in FIG. 8, after a TA in a trusted execution environment (e.g., TEE) generates security data for target data to be decrypted of the application, and the security data is output to an untrusted execution environment (e.g., REE). In the untrusted execution environment (e.g., REE), the target data 801 is decrypted using a symmetric key algorithm, and a plaintext after decryption is the source data 802.

For example, the security data includes a secondary key, or a secondary key and a vector (one-time IV).

In some embodiments, in the untrusted execution environment (e.g., REE), the target data is decrypted into the source data by calling the AES algorithm in the symmetric key algorithms and using a vector, as an initialization vector IV, and a secondary key.

Figure 9:
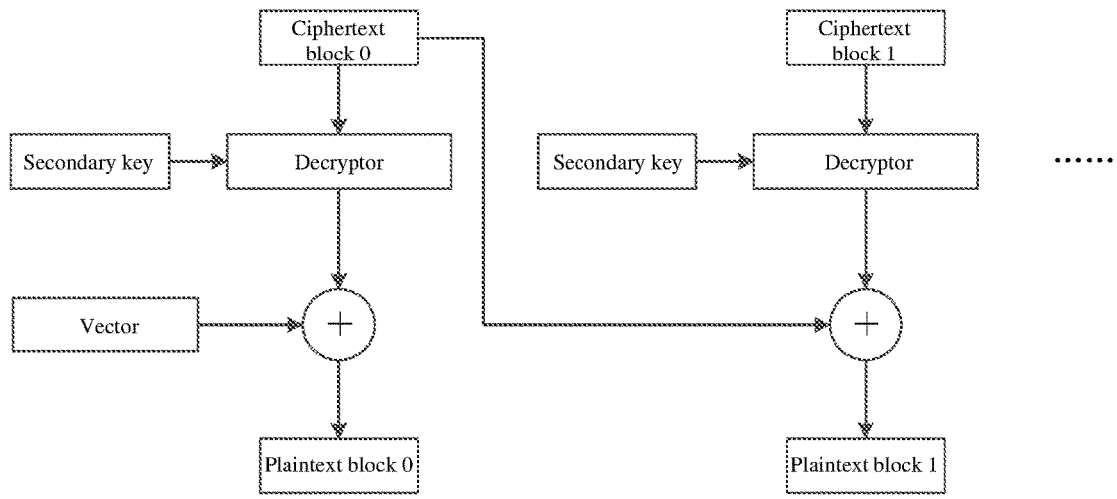
FIG. 9 is a schematic diagram of a decryption process by an AES according to some embodiments of the present disclosure.

As shown in FIG. 9, in the CBC mode of the AES algorithm, block decryption is implemented to split target data into a plurality of ciphertext blocks, such as ciphertext block 0, ciphertext block 1, . . . , and so on. For each ciphertext block, after a decryptor decrypts using a secondary key, an XOR processing is performed on a decryption result and an encryption vector, plaintext blocks, such as ciphertext block 0, ciphertext block 1, . . . , and so on, are output, and a combination result of combining the plaintext blocks is the source data.

For the first plaintext block (i.e., plaintext block 0), the encryption vector is the initialization vector IV, that is, the vector in the security data. For the $n^{th}$ (n>1) plaintext block (i.e., plaintext block n−1), e.g., plaintext block 1, . . . , and so on, the encryption vector is the $(n-1)^{th}$ ciphertext block (i.e., ciphertext block n−2), e.g., ciphertext block 0, . . . , and so on.

In another embodiment, in the untrusted execution environment, the target data is decrypted into the source data using a secondary key and calling a non-AES algorithm in the symmetric key algorithms.

The decryption algorithms and the security parameters are only examples, and other decryption algorithms and security parameters are set according to actual situations in implementing other embodiments of the present disclosure. Moreover, in addition to the above decryption algorithm and security parameters thereof, those skilled in the art can also adopt other decryption algorithms and security parameters according to actual needs.

In some embodiments, the target data requested to be encrypted by an application is determined in an untrusted execution environment. The reference data associated with the target data is read in the untrusted execution environment, and the reference data is data for one-time use in decrypting the target data. A primary key generated for the application is read in a trusted execution environment. The reference data is encrypted using the primary key in the trusted execution environment to acquire security data; and the target data is decrypted using the security data to acquire the source data in the untrusted execution environment.

The trusted execution environment is implemented based on a security chip at a hardware level, and an attacker is difficult to break the security chip, such that the security strength of the trusted execution environment is high, and the security of the primary key and the security data is ensured.

The primary key is generated for one application, such that the primary keys used by the applications of the same version or the applications of all versions are different. The reference data is valid in this encryption and decryption, such that the security data generated based on the primary key and the reference data has the characteristic of one-time use. The one-time security data is not directly stored but generated in a trusted execution environment to meet the security of chosen-plaintext attack (CPA), and cannot be the reversely cracked.

As the security data has the characteristic of one-time use, other mobile terminals do not generate the same security data for the same source data. Thus, the encrypted target data, even leaving the mobile terminal, cannot be decrypted by other mobile terminals.

As the inside of the trusted execution environment is protected by mandatory access control and is not directly accessed by the untrusted execution environment, the attacker cannot call a function for starting the primary key to decrypt the data. Thus, the aim of preventing illegal call attack is fulfilled.

In addition, the security data is generated in the trusted execution environment, and the low computation overhead in the trusted execution environment is ensured due to the small data amount of the security data. In the untrusted execution environment, the source data is encrypted and decrypted using the security data based on the processor with higher performance than the security chip, such that the low computation overhead in the trusted execution environment is ensured, and the low whole computation overhead is ensured.

Finally, the trusted execution environment and the untrusted execution environment are deployed in most mobile terminals. In addition, the cryptographic algorithm provided by the mobile terminal is sharable, such that the compatibility is within an acceptable degree, library files is not necessary to be deployed additionally, and the storage overhead is low.

In some embodiments of the present disclosure, the method further includes:
    detecting a first operation of installing an application in an untrusted execution environment; and
    generating, in response to the first operation, a primary key for the application in a trusted execution environment.

In some embodiments of the present disclosure, the method further includes:
    associatively storing the target data and the reference data in the untrusted execution environment.

In some embodiments of the present disclosure, the method further includes:
    detecting a second operation of deleting the target data; and
    deleting, in response to the second operation, the target data and the reference data from the untrusted execution environment.

In some embodiments of the present disclosure, the method further includes:
    detecting a third operation of unloading the application;
    deleting, in response to the third operation, the primary key generated for the application from the trusted execution environment; and
    deleting, in response to the third operation, the target data and the reference data from the untrusted execution environment.

In some embodiments of the present disclosure, as the responses of the first operation, the second operation, and the third operation are substantially similar to the application of above embodiments, the similar contents can be referred to the part of the description of above embodiments, and the embodiments of the present disclosure are not described in detail herein.

Fourth Embodiment

Figure 10:
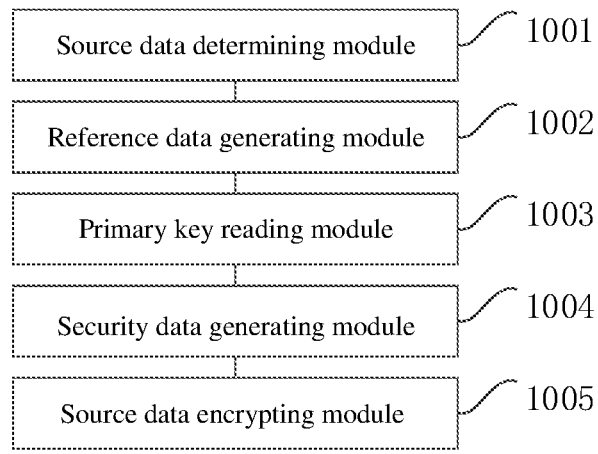
FIG. 10 is a schematic structural diagram of a data encryption apparatus according to some embodiments of the present disclosure.

FIG. 10 is a schematic structural diagram of a data encryption apparatus according to some embodiments of the present disclosure; the apparatus may include the following modules:
    a source data determining module 1001, configured to determine source data requested to be encrypted by an application in an untrusted execution environment;
    a reference data generating module 1002, configured to generate reference data corresponding to the source data in the untrusted execution environment, wherein the reference data is data for one-time use in encrypting the source data;
    a primary key reading module 1003, configured to read a primary key generated for the application in a trusted execution environment;
    a security data generating module 1004, configured to acquire security data by encrypting the reference data using the primary key in the trusted execution environment; and
    a source data encrypting module 1005, configured to acquire target data by encrypting the source data using the security data in the untrusted execution environment.

In some embodiments of the present disclosure, the reference data generating module 1002 includes:
    a random value generating sub-module, configured to randomly generate a value as the reference data in the untrusted execution environment;
    and/or,
    a timestamp reading sub-module, configured to read a current timestamp as the reference data in the untrusted execution environment.

In some embodiments of the present disclosure, the security data generating module 1004 includes:
    a target array combining sub-module, configured to acquire a target array by combining the reference data and a predetermined label in the trusted execution environment, wherein the label is defined to indicate a type of the security data;

a candidate data generating sub-module, configured to acquire candidate data by encrypting the target array using the primary key; and a candidate data regulating sub-module, configured to regulate the candidate data into data with a specified length and determine the data with the specified length as security data matching the label.

In some embodiments of the present disclosure, the security data includes a secondary key, or a secondary key and a vector; and the candidate data regulating sub-module includes:

a first digest computing unit, configured to compute, in response to the label being a first value, digest data with a first specified length for the candidate data in the trusted execution environment, and determine the digest data with the first specified length as the secondary key and the vector;

or, a second digest computing unit, configured to compute, in response to the label being a second value, digest data with a second specified length for the candidate data in the trusted execution environment, and determine the digest data with the second specified length as the secondary key.

In some embodiments of the present disclosure, the security data includes a secondary key, or a secondary key and a vector; and the source data encrypting module 1005 includes:

a first symmetric encrypting sub-module, configured to encrypt the source data as the target data in the untrusted execution environment by calling an advanced encryption standard (AES) algorithm in a symmetric key algorithm and using the vector, as an initialization vector, and the secondary key;

or, a second symmetric encrypting sub-module, configured to encrypt the source data as the target data in the untrusted execution environment by calling a non-AES algorithm in the symmetric key algorithm and using the secondary key.

In some embodiments of the present disclosure, the apparatus further includes:

an install operation detecting module, configured to detect a first operation of installing an application in an untrusted execution environment;

a primary key generating module, configured to, in response to the first operation, generate a primary key for the application in a trusted execution environment.

In some embodiments of the present disclosure, the apparatus further includes:

an associative storing module, configured to associatively store the target data and the reference data in the untrusted execution environment.

In some embodiments of the present disclosure, the apparatus further includes:

a delete operation detecting module, configured to detect a second operation of deleting the target data; and an associative deleting module, configured to delete, in response to the second operation, the target data and the reference data from the untrusted execution environment.

In some embodiments of the present disclosure, the apparatus further includes:

an unload operation detecting module, configured to detect a third operation of unloading the application;

a primary key deleting module, configured to delete, in response to the third operation, the primary key generated for the application from the trusted execution environment; and a bulk data deleting module, configured to delete, in response to the third operation, the target data and the reference data from the untrusted execution environment.

The data encryption apparatus according to the embodiments of the present disclosure performs the data encryption method according to any embodiment of the present disclosure, and has corresponding functional modules and beneficial effects of performing the method.

Fifth Embodiment

Figure 11:
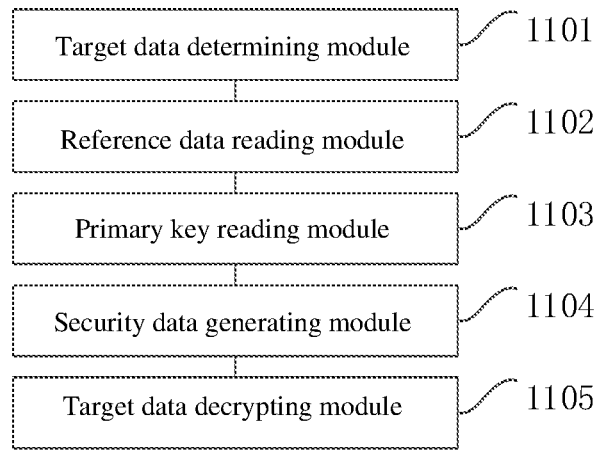
FIG. 11 is a schematic structural diagram of a data decryption apparatus according to some embodiments of the present disclosure.

FIG. 11 is a schematic structural diagram of a data decryption apparatus according to some embodiments of the present disclosure. The apparatus includes the following modules:

a target data determining module 1101, configured to determine target data requested to be encrypted by an application in an untrusted execution environment;

a reference data reading module 1102, configured to read reference data associated with the target data in the untrusted execution environment, wherein the reference data is data for one-time use in decrypting the target data;

a primary key reading module 1103, configured to read a primary key generated for the application in a trusted execution environment;

a security data generating module 1104, configured to acquire security data by encrypting the reference data using the primary key in the trusted execution environment; and a target data decrypting module 1105, configured to acquire source data by decrypting the target data using the security data in the untrusted execution environment.

In some embodiments of the present disclosure, the security data generating module 1104 includes:

a target array combining sub-module, configured to acquire a target array by combining the reference data and a predetermined label in the trusted execution environment, wherein the label is defined to indicate a type of the security data;

a candidate data generating sub-module, configured to acquire candidate data by encrypting the target array using the primary key; and a candidate data regulating sub-module, configured to regulate the candidate data into data with a specified length and determine the data with the specified length as security data matching the label.

In some embodiments of the present disclosure, the security data includes a secondary key, or a secondary key and a vector; and the candidate data regulating sub-module includes:

a first digest computing unit, configured to compute, in response to the label being a first value, digest data with a first specified length for the candidate data in the trusted execution environment, and determine the digest data with the first specified length as the secondary key and the vector;

or,
   a second digest computing unit, configured to compute, in response to the label being a second value, digest data with a second specified length for the candidate data in the trusted execution environment, and determine the digest data with the second specified length as the secondary key.

In some embodiments of the present disclosure, the security data includes a secondary key, or a secondary key and a vector; and
   the target data decrypting module 1105 includes:
   a first symmetric decrypting sub-module, configured to decrypt the target data as source data in the untrusted execution environment by calling an advanced encryption standard (AES) algorithm in a symmetric key algorithm and using the vector, as an initialization vector, and the secondary key;
   or,
   a second symmetric decrypting sub-module, configured to decrypt the target data as source data in the untrusted execution environment by calling a non-AES algorithm in a symmetric key algorithm and using the secondary key.

In some embodiments of the present disclosure, the apparatus further includes:
   an install operation detecting module, configured to detect a first operation of installing an application in an untrusted execution environment;
   a primary key generating module, configured to generate, in response to the first operation, a primary key for the application in a trusted execution environment.

In some embodiments of the present disclosure, the apparatus further includes:
   an associative storing module, configured to associatively store the target data and the reference data in the untrusted execution environment.

In some embodiments of the present disclosure, the apparatus further includes:
   a delete operation detecting module, configured to detect a second operation of deleting the target data; and
   an associative deleting module, configured to delete, in response to the second operation, the target data and the reference data from the untrusted execution environment.

In some embodiments of the present disclosure, the apparatus further includes:
   an unload operation detecting module, configured to detect a third operation of unloading the application;
   a primary key deleting module, configured to delete, in response to the third operation, a primary key generated for the application from the trusted execution environment; and
   a bulk data deleting module, configured to delete, in response to the third operation, the target data and the reference data from the untrusted execution environment.

The data decryption apparatus according to the embodiments of the present disclosure performs the data decryption method according to any embodiment of the present disclosure, and has corresponding functional modules and beneficial effects to of performing the method.

Sixth Embodiment

Figure 12:
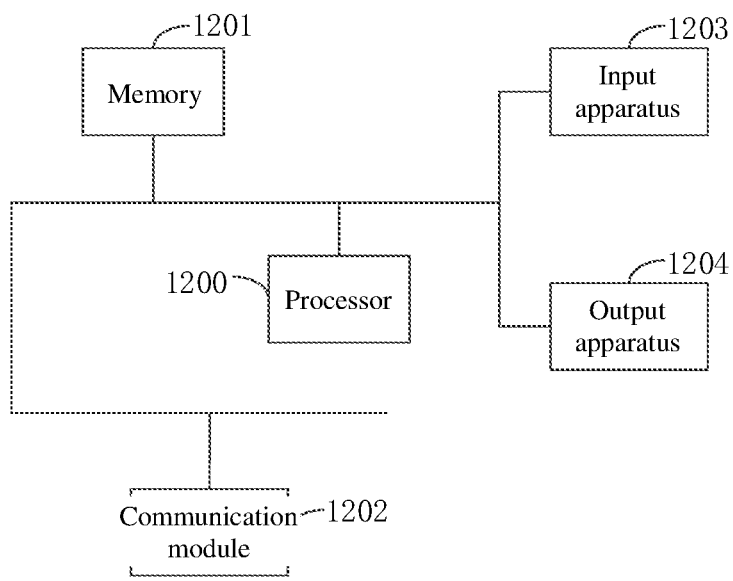
FIG. 12 is a schematic structural diagram of a mobile terminal according to some embodiments of the present disclosure.

FIG. 12 is a schematic structural diagram of a mobile terminal according to some embodiments of the present disclosure. As shown in FIG. 12, the mobile terminal includes a processor 1200, a memory 1201, a communication module 1202, an input apparatus 1203, and an output apparatus 1204. The number of the processors 1200 in the mobile terminal is one or more, and one processor 1200 is taken as an example in FIG. 12. In some embodiments, the processor 1200, the memory 1201, the communication module 1202, the input apparatus 1203, and the output apparatus 1204 in the mobile terminal are connected by a bus or other means, and the connection by the bus is taken as an example in FIG. 12.

The memory 1201, as a computer-readable storage medium, is configured to store software programs, computer-executable programs, and modules, such as modules corresponding to the data encryption method and the data decryption method in the embodiments, for example, a source data determining module 1001, a reference data generating module 1002, a primary key reading module 1003, a security data generating module 1004, and a source data encrypting module 1005 in the data encryption apparatus shown in FIG. 10, and a target data determining module 1101, a reference data reading module 1102, a primary key reading module 1103, a security data generating module 1104, and a target data decrypting module 1105 in the data decryption apparatus shown in FIG. 11. The processor 1200, when running software programs, instructions, and modules stored in the memory 1201, is caused to execute various functional applications and data processing of the mobile terminal, that is, perform the data encryption method and the data decryption method described above.

The memory 1201 mainly includes a program storage region and a data storage region. The program storage region stores an operating system, an application program required for at least one function. The operating system is at least one of a general purpose operating system and a trusted operating system, and the data storage region stores data created based on the use of the mobile terminal, and the like. Furthermore, the memory 1201 includes a high speed random access memory, and a non-volatile memory, such as at least one magnetic disk memory, flash memory, or other non-volatile solid state memory. In some examples, the memory 1201 includes memories disposed remotely from the processor 1200 and capable of being connected to the mobile terminal via a network. Examples of the above network include the Internet, intranets, local area networks, mobile communication networks, combinations thereof, and the like.

The communication module 1202 is configured to establish a connection with the display screen and achieve data interaction with the display screen.

The input apparatus 1203 is configured to receive input numeric or character information and generate key signal inputs related to user settings and function control of the mobile terminal. In some embodiments, the input apparatus 1203 is a camera for acquiring images and a sound pickup device for acquiring audio data.

The output apparatus 1204 includes an audio device such as a speaker.

The assemblies of the input apparatus 1203 and the output apparatus 1204 are set based on actual conditions.

The processor 1200, when running software programs, instructions, and modules stored in the memory 1201, is caused to execute various functional applications and data processing of the mobile terminal, that is, perform the data encryption method and the data decryption method described above.

The mobile terminal according to the embodiments performs the data encryption method and the data decryption method according to any embodiment of the present disclosure, so as to implement corresponding functions and beneficial effects.

Seventh Embodiment

The embodiments of the present disclosure further provide a computer-readable storage medium storing a computer program thereon. The computer program, when loaded and run by a processor, causes the processor to perform the data encryption method or the data decryption method.

The data encryption method includes:
determining source data requested to be encrypted by an application in an untrusted execution environment;
generating reference data corresponding to the source data in the untrusted execution environment, wherein the reference data is data for one-time use in encrypting the source data;
reading a primary key generated for the application in a trusted execution environment;
acquiring security data by encrypting the reference data using the primary key in the trusted execution environment; and
acquiring target data by encrypting the source data using the security data in the untrusted execution environment.

The data decryption method includes:
determining target data requested to be encrypted by an application in an untrusted execution environment;
reading reference data associated with the target data in the untrusted execution environment, wherein the reference data is data for one-time use in decrypting the target data;
reading a primary key generated for the application in a trusted execution environment;
acquiring security data by encrypting the reference data using the primary key in the trusted execution environment; and
acquiring source data by decrypting the target data by using the security data in the untrusted execution environment.

The computer program in the computer-readable storage medium in the embodiments of the present disclosure is not limited to the method operations described above, and the embodiments of the present disclosure may also execute related operations in the data encryption method and the data decryption method according to any embodiment of the present disclosure.

Based on the above description of the embodiments, it is obvious for those skilled in the art that the present disclosure is implemented through software and general purpose hardware, or through hardware. Based on such understanding, the essence of the embodiments of the present disclosure and the contribution related to some practices are embodied in the form of a software product. The software product is stored in a computer-readable storage medium, such as a floppy disk, a read-only memory (ROM), a random access memory (RAM), a flash, a hard disk, or an optical disk of a computer. The software product includes a plurality of instructions to cause a mobile terminal (which may be a personal computer, a server, a network device, and the like) to perform the methods according to the embodiments of the present disclosure.

In the above embodiments of the data encryption apparatus and the data decryption apparatus, the plurality of units and modules are only divided based on functional logic, but are not limited to the above division, as long as the corresponding functions can be implemented. In addition, the names of all the functional units are also only for distinguishing.

What is claimed is:

1. A data encryption method, comprising:
detecting a first operation of installing an application in an untrusted execution environment;
generating a primary key for the application in a trusted execution environment in response to the first operation, wherein the primary key is stored in the trusted execution environment, and a mapping relationship between an identification of the application and the primary key is established in a database of the trusted execution environment;
determining source data requested to be encrypted by the application in the untrusted execution environment;
generating reference data corresponding to the source data in the untrusted execution environment, wherein the reference data is data for one-time use in encrypting the source data, and the reference data is a combination of a random value generated by a rand function and a current timestamp read from a general purpose operating system;
reading the primary key generated for the application in the trusted execution environment; acquiring security data by encrypting the reference data using the primary key in the trusted execution environment;
acquiring target data by encrypting the source data using the security data in the untrusted execution environment; and
establishing an association relationship between the target data and the reference data, and associatively storing the target data and the reference data in the untrusted execution environment.

2. The method according to claim 1, wherein generating the reference data corresponding to the source data in the untrusted execution environment comprises:
randomly generating a value as the reference data in the untrusted execution environment; and/or
reading a current timestamp as the reference data in the untrusted execution environment.

3. The method according to claim 1, wherein acquiring the security data by encrypting the reference data using the primary key in the trusted execution environment comprises:
acquiring a target array by combining the reference data and a predetermined label in the trusted execution environment, wherein the predetermined label is defined to indicate a type of the security data;
acquiring candidate data by encrypting the target array using the primary key in the trusted execution environment; and
regulating the candidate data into data with a specified length in the trusted execution environment, and determining the data with the specified length as security data matching the predetermined label.

4. The method according to claim 3, wherein the security data comprises a secondary key, or a secondary key and a vector; and
regulating the candidate data into the data with the specified length in the trusted execution environment, and determining the data with the specified length as the security data matching the predetermined label comprise:
computing, in response to the predetermined label being a first value, digest data with a first specified length for the candidate data in the trusted execution environment, and determining the digest data with the first specified length as the secondary key and the vector; or computing, in response to the predetermined label being a second value, digest data with a second specified length for the candidate data in the trusted execution environment, and determining the digest data with the second specified length as the secondary key.

5. The method according to claim 1, wherein the security data comprises a secondary key, or a secondary key and a vector; and acquiring the target data by encrypting the source data using the security data in the untrusted execution environment comprises:

encrypting the source data as the target data in the untrusted execution environment by calling an advanced encryption standard (AES) algorithm in a symmetric key algorithm and using the vector, as an initialization vector, the secondary key; or encrypting the source data as the target data in the untrusted execution environment by calling a non-AES algorithm in the symmetric key algorithm and using the secondary key.

6. The method according to claim 1, further comprising: detecting a second operation of deleting the target data; and deleting, in response to the second operation, the target data and the reference data from the untrusted execution environment.

7. The method according to claim 1, further comprising:
detecting a third operation of unloading the application;
deleting, in response to the third operation, the primary key generated for the application from the trusted execution environment; and
deleting, in response to the third operation, the target data and the reference data from the untrusted execution environment.

8. A non-transitory computer-readable storage medium, storing a computer program thereon, wherein the computer program, when loaded and run by a processor, causes the processor to perform the data encryption method according to claim 1.

9. A data decryption method, comprising:
detecting a first operation of installing an application in an untrusted execution environment;
generating a primary key for the application in a trusted execution environment in response to the first operation, wherein the primary key is stored in the trusted execution environment, and a mapping relationship between an identification of the application and the primary key is established in a database of the trusted execution environment;
determining target data requested to be encrypted by the application in the untrusted execution environment;
reading reference data associated with the target data in the untrusted execution environment, wherein the reference data is data for one-time use in decrypting the target data, and the reference data is a combination of a random value generated by a rand function and a current timestamp read from a general purpose operating system;
reading the primary key generated for the application in the trusted execution environment; acquiring security data by encrypting the reference data using the primary key in the trusted execution environment;
acquiring source data by decrypting the target data using the security data in the untrusted execution environment; and establishing an association relationship between the target data and the reference data, and associatively storing the target data and the reference data in the untrusted execution environment.

10. The method according to claim 9, further comprising: detecting a second operation of deleting the target data; and deleting, in response to the second operation, the target data and the reference data from the untrusted execution environment.

11. A data decryption mobile terminal, comprising:
one or more processors; and
a memory configured to store one or more programs; wherein
the one or more processors, when loading and running the one or more programs, are caused to perform the data decryption method according to claim 9.

12. A non-transitory computer-readable storage medium, storing a computer program thereon, wherein the computer program, when loaded and run by a processor, causes the processor to perform the data decryption method according to claim 9.

13. A data encryption mobile terminal, comprising: one or more processors; and a memory configured to store one or more programs; wherein the one or more processors, when loading and running the one or more programs, are caused to perform:

detecting a first operation of installing an application in an untrusted execution environment;
generating a primary key for the application in a trusted execution environment in response to the first operation, wherein the primary key is stored in the trusted execution environment, and a mapping relationship between an identification of the application and the primary key is established in a database of the trusted execution environment;
determining source data requested to be encrypted by the application in the untrusted execution environment;
generating reference data corresponding to the source data in the untrusted execution environment, wherein the reference data is data for one-time use in encrypting the source data, and the reference data is a combination of a random value generated by a rand function and a current timestamp read from a general purpose operating system;
reading the primary key generated for the application in the trusted execution environment;
acquiring security data by encrypting the reference data using the primary key in the trusted execution environment;
acquiring target data by encrypting the source data using the security data in the untrusted execution environment; and
establishing an association relationship between the target data and the reference data, and associatively storing the target data and the reference data in the untrusted execution environment.

14. The data encryption mobile terminal according to claim 13, wherein the one or more processors, when loading and running the one or more programs, are caused to perform: randomly generating a value as the reference data in the untrusted execution environment; and/or reading a current timestamp as the reference data in the untrusted execution environment.

15. The data encryption mobile terminal according to claim 13, wherein the one or more processors, when loading and running the one or more programs, are caused to perform: acquiring a target array by combining the reference data and a predetermined label in the trusted execution environment, wherein the predetermined label is defined to indicate a type of the security data; acquiring candidate data by encrypting the target array using the primary key in the trusted execution environment; and regulating the candidate data into data with a specified length in the trusted execution environment, and determining the data with the specified length as security data matching the predetermined label.

16. The data encryption mobile terminal according to claim 15, wherein the security data comprises a secondary key, or a secondary key and a vector; and the one or more processors, when loading and running the one or more programs, are caused to perform:

computing, in response to the predetermined label being a first value, digest data with a first specified length for the candidate data in the trusted execution environment, and determining the digest data with the first specified length as the secondary key and the vector; or computing, in response to the predetermined label being a second value, digest data with a second specified length for the candidate data in the trusted execution environment, and determining the digest data with the second specified length as the secondary key.

17. The data encryption mobile terminal according to claim 13, wherein the security data comprises a secondary key, or a secondary key and a vector; and the one or more processors, when loading and running the one or more programs, are caused to perform:

encrypting the source data as the target data in the untrusted execution environment by calling an advanced encryption standard (AES) algorithm in a symmetric key algorithm and using the vector, as an initialization vector, the secondary key; or encrypting the source data as the target data in the untrusted execution environment by calling a non-AES algorithm in the symmetric key algorithm and using the secondary key.

* * * * *